US008517385B2

(12) United States Patent
Harris

(10) Patent No.: US 8,517,385 B2
(45) Date of Patent: Aug. 27, 2013

(54) PLAYING CARD GAME AND METHOD THEREFOR

(75) Inventor: Stephen Harris, Henderson, NV (US)

(73) Assignee: Snakeyes Gaming, Inc., Henderson, NV (US)

( * ) Notice: Subject to any disclaimer, the term of this patent is extended or adjusted under 35 U.S.C. 154(b) by 0 days.

(21) Appl. No.: 13/471,251

(22) Filed: May 14, 2012

(65) Prior Publication Data

US 2012/0309500 A1 Dec. 6, 2012

Related U.S. Application Data

(60) Provisional application No. 61/492,070, filed on Jun. 1, 2011.

(51) Int. Cl.
*A63F 13/00* (2006.01)
*A63F 1/00* (2006.01)

(52) U.S. Cl.
USPC .......... 273/274; 273/292; 273/138.2; 463/12; 463/13

(58) Field of Classification Search
USPC ............... 273/292, 274, 309, 138.2, 292.274; 463/12, 13
See application file for complete search history.

(56) References Cited

U.S. PATENT DOCUMENTS

| | | | | |
|---|---|---|---|---|
| 5,374,067 | A * | 12/1994 | Jones | 273/292 |
| 5,613,682 | A * | 3/1997 | Otuzbiryan | 273/292 |
| 6,027,119 | A * | 2/2000 | De Lisle | 273/292 |
| 6,575,466 | B1 * | 6/2003 | Lizak | 273/292 |

* cited by examiner

*Primary Examiner* — Benjamin Layno
(74) *Attorney, Agent, or Firm* — Jeffrey D. Moy; Weiss & Moy, P.C.

(57) ABSTRACT

A method of playing a card wagering game comprising: dealing a first two player cards face up to a player; placing a wager by the player on at least one wager location of a plurality of wager locations, wherein each wager location represents different ranges of numbers; dealing three dealer cards to the player; totaling the combined value of the first two player cards and the three dealer cards; and determining if the player has a winning wager by determining if the total combined value of the first two player cards and the three dealer cards is in a range of numbers wagered by the player.

11 Claims, 2 Drawing Sheets

| | | | | | |
|---|---|---|---|---|---|
| Royal Flush | 5000 | 10,000 | 15,000 | 20,000 | 25,000 |
| Straight Flush | 500 | 1000 | 1500 | 2000 | 2500 |
| 10 and under | 200 | 400 | 600 | 800 | 1000 |
| Four of Kind | 100 | 200 | 300 | 400 | 500 |
| Full House | 30 | 60 | 90 | 120 | 150 |
| Flush | 20 | 40 | 60 | 80 | 100 |
| Straight | 10 | 20 | 30 | 40 | 50 |
| 11 to 20 | 5 | 10 | 15 | 20 | 25 |
| Three of Kind | 4 | 8 | 12 | 16 | 20 |
| 44 and Up | 3 | 6 | 9 | 12 | 15 |
| 21 to 27 | 2 | 4 | 6 | 8 | 10 |
| 28 to 35 | 1 | 2 | 3 | 4 | 5 |
| 36 to 43 | 1 | 2 | 3 | 4 | 5 |

PLAYING CARD GAME AND METHOD THEREFOR

RELATED APPLICATIONS

This application is related to U.S. Provisional Application Ser. No. 61/492,070, filed Jun. 1, 2011, in the name of the same inventor, and entitled, "PLAYING CARD GAME AND METHOD THEREFOR", the present patent application claims the benefit under 35 U.S.C. §119(e).

BACKGROUND

The present invention relates generally to card games, and more specifically, to a method of playing multi hand card wagering game and playing a game combing the total value of five cards and placing a wager on the outcome. The method of playing this game could be against the house or against other players with the house taking a rake from each game.

There is a wide variety of gambling card games. Different types of games can involve different degrees of complexity and skill. It is desirable for a game to have the right degree of complexity, if to complex, than many potential players will be not interested in playing the game.

Therefore, it would be desirable to provide a card game and method that overcomes the above problems.

SUMMARY

A method of playing a card wagering game comprising: dealing a first two player cards face up to a player; placing a wager by the player on at least one wager location of a plurality of wager locations, wherein each wager location represents different ranges of numbers; dealing three dealer cards to the player; totaling the combined value of the first two player cards and the three dealer cards; and determining if the player has a winning wager by determining if the total combined value of the first two player cards and the three dealer cards is in a range of numbers wagered by the player.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

A wagering game is disclosed below. The wagering game may be played on a table, a computer, or the like. In a computer system 16, the computer system 16 may have a processor for executing program instructions for the playing of the wagering game.

The wagering game may be played with a standard deck of 52 cards. The number of standard decks of cards may be based on the number of hands the player selects prior to the start of play. If the player selects three hands for play-at a time then three standard decks of 52 cards may be used. In the preferred embodiment the player selects number of hands for play prior to the start of the game.

The example below is based on the player selecting three hands for play. The dealer deals two cards 10 face up to the player and these two cards 10 are automatically duplicated in three separate hands. The player will make a wager on the player surface 12 based on what he feels the total amount value of the five cards to be dealt (the first two player cards that are duplicated in all three hands and the three dealer cards). There will be a plurality of different possible wagers. In the embodiment depicted FIG. 1 six possible wager options are shown.

Figure 1:
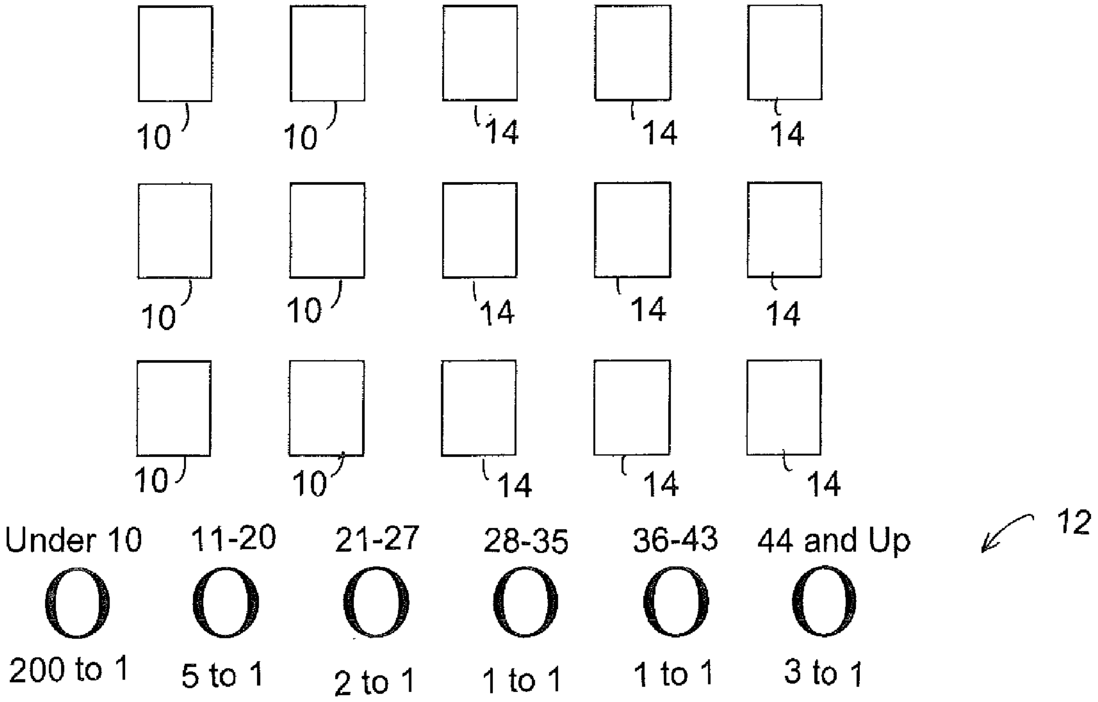
FIG. 1 shows a layout of the game of the present invention.
Figure 2:
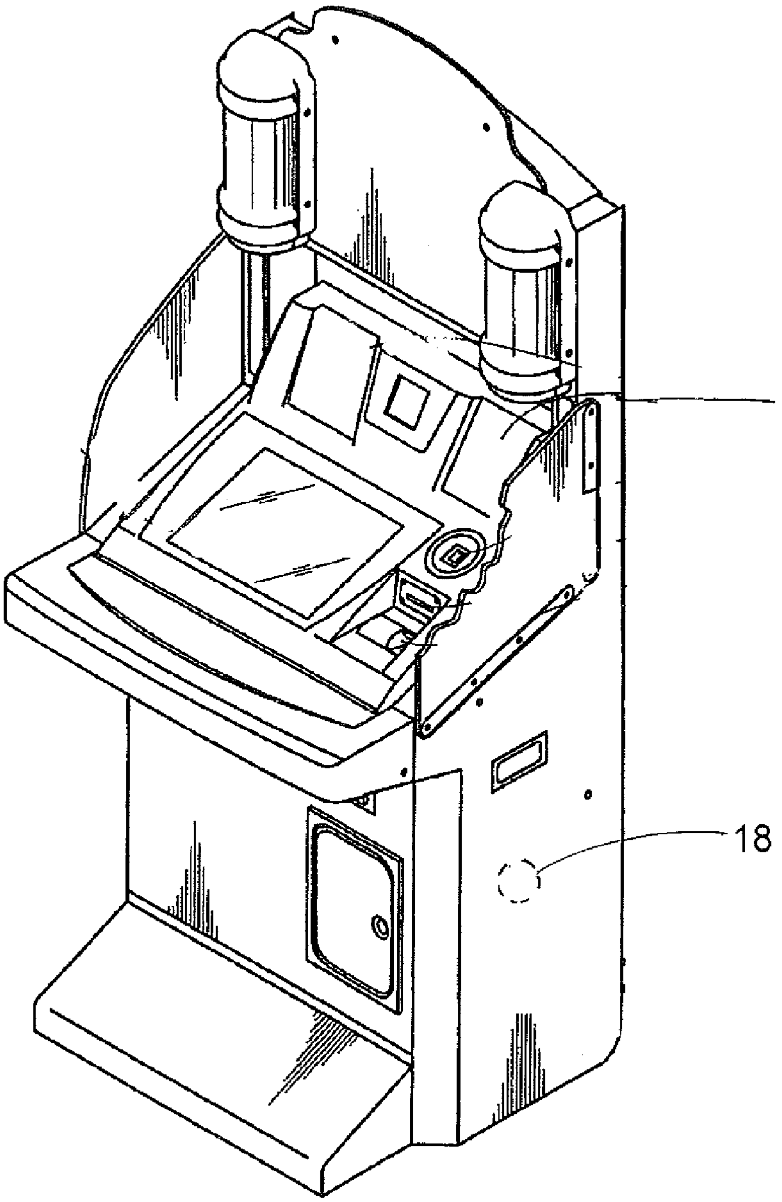
FIG. 2 shows a video gaming terminal for playing the game of the present invention.

For example, as shown in FIG. 1 the first wager location has a number range of 10 and under. A second wager location has a range of 11 to 20. A third wager location has a range of 21 to 27. A fourth wager location has a range of 28 to 35. A fifth wager location has a range of 36 to 43. A sixth wager location has a range of 44 and up. It should be noted that the number of wager locations and the range of numbers for each wager location, is given an example and should not be seen as to limit the scope of the present invention. Each wager location will have different payout odds associated with them. Payout odds may range from 200 for 1 for 10 and under, 5 for 1 for 11 to 21, 3 for 1 for 44 and above, 2 for 1 for 21 to 27 and for 1 for 28 to 35 and 36 to 43. Again, the payout odds listed are given as an example and should not be seen as to limit the scope of the present invention.

After the player makes a wager, three additional cards 14 are dealt and exposed by the dealer from a first standard 52 card deck. A second standard 52 card deck is used to automatically deal three cards in the second hand, and a third standard 52 card deck is used to deal three additional cards in the third hand. In the preferred embodiment, the two player cards 10 used in the three hands dealt would be removed from the second and third deck so you could not receive one of the dealers first two cards in the second or third hand. For example, if the two of clubs and three of hearts are the first two cards dealt, they are automatically the first two cards dealt in all three hands. The three remaining cards 14 for each hand could not include the two of clubs and three of hearts in any hand.

A player will win if the total count of the five cards in each hand is with in the range of numbers the player selected. A player will lose if the total count of the five cards in each hand is not within the range of numbers he selected. The wager the player selects will encompass all the hands. Therefore, the player could win three times on one bet. The player can win an additional bonus payout if any of the hands dealt of the five cards equal a predetermined poker hand. The odds listed on the playing surface will determine the payouts. The game could be played with one hand, three hands, five hands or any multitude number of hands.

In the game, each card has the following point value: 2=2 points, 3=3 points, 4=4 points, 5=5 points, 6=6 points, 7=7 points, 8=8 points, 9=9 points, 10=10 points, jack=10 points, queen=10 points, king=10 points, ace=1 or 11 points (Player's option).

The following gives an example of how to play the above game: The player inserts a wager and selects to play three hands. The first two cards face up is a ten of clubs and jack of clubs; this ten of clubs and jack of clubs will be automatically dealt as the first two cards in all three hands. The player makes a wager on the range of numbers of 44 and up. By doing this if any of the hands the total point value equals 44 or above the wager wins.

The dealer deals three additional cards in the first hand: queen of hearts, seven of clubs and ace of hearts therefore totaling: 10+10+10+7+11=48 the player wins in this hand;

The dealer deals three additional cards in the second hand: two of clubs, four of spades and seven of clubs; therefore totaling: 10+10+2+4+7=33 the player looses in this hand;

The dealer deals three additional cards in the third hand: nine of clubs, king of clubs and seven of clubs; therefore totaling: 10+10+9+10+7=46 player wins in this hand. In addition, since all five cards are clubs, the player would receive a bonus for the flush as determined by the payout odds on the machine. The bonus hands could include any poker hand, progressive jackpot, aggregate jackpot, wide area network jackpot, inter-casino linked jackpot, multi location linked jackpot, sequential Royal Flush or based on the value of the poker hand of the five cards.

In addition, the game could be played changing the point value of all deuces (the two of hearts, two of clubs, two of spades, two of diamonds) and making them wild cards, the player could make the deuces (wild cards) any value from one to eleven.

Furthermore, the game could be played allowing the player to make a side wager before the game begins to win a progressive jackpot or other type jackpot or payout as determined by the casino. The progressive jackpot winning hand could be a poker hand or in the preferred embodiment, a sequential royal flush.

In another embodiment of this invention, this game is played as stated in the preferred embodiment only more than one player is playing the game at the same time as another player. In this embodiment, each player is playing against another player or players. In this method of play the house takes a rake from the initial wager of all players and the remaining pot is split to make the payouts for each hand. The player can win or lose based on the outcome of other players playing their game. For example, four players are competing against each other; each player plays their own hand. If the player wins their hand their payout will be paid from the remaining pot. If the pot does not cover the payout the remaining players pay an equal proportion of the payout until the payout is paid in full to the winning player. If any player loses their hands or hands, that amount lost is paid proportionally to the other players minus the rake taken for the house.

While embodiments of the disclosure have been described in terms of various specific embodiments, those skilled in the art will recognize that the embodiments of the disclosure can be practiced with modifications within the spirit and scope of the claims.

What is claimed is:

1. A video playing card wagering game having a processor, wherein the processor executes program instructions comprising:
- dealing a first two player cards face up to a player;
- placing a wager by the player on at least one wager location of a plurality of wager locations, wherein each wager location represents different ranges of numbers;
- dealing three dealer cards to the player;
- totaling the combined value of the first two player cards and the three dealer cards; and
- determining if the player has a winning wager by determining if the total combined value of the first two player cards and the three dealer cards is in a range of numbers wagered by the player.

2. The video playing card wagering game of claim 1, wherein dealing two player cards face up to a player further comprises dealing the first two player cards face up to a player from a standard deck of playing cards.

3. The video playing card wagering game of claim 1, wherein dealing three dealer cards face up further comprises dealing three dealer cards to the player from a standard deck of playing cards.

4. The video playing card wagering game of claim 1, wherein the program instructions further comprises:
- determining a number of additional hands the player will play for a current round, wherein each hand is played with a separate standard deck of playing cards;
- dealing the same two player cards face up to the player from each separate standard deck of playing cards for each additional hand;
- dealing for each additional hand three dealer cards to the player;
- totaling the combined value of the first two player cards and the three dealer cards for each hand; and
- determining if the player has a winning wager by determining if the total combined value of the first two player cards and the three dealer cards for each hand is in a range of numbers wagered by the player.

5. The video playing card wagering game of claim 4, wherein the program instructions further comprises placing a wager by the player on at least one wager location of a plurality of wager locations for each additional hand.

6. The video playing card wagering game of claim 1, wherein the program instructions further comprises paying a bonus payoff when the combination of first two player cards and the three dealer cards represents a designated poker hand.

7. The video playing card wagering game of claim 1, wherein the program instructions further comprises making a separate wager before the current round begins for a progressive bonus.

8. A video playing card wagering game having a processor, wherein the processor executes program instructions comprising:
- determining a number of hands the player will play for a current round, wherein each hand is played with a separate standard deck of playing cards;
- dealing a first two player cards face up to a player for a first hand;
- dealing the same two player cards face up to the player from each separate standard deck of playing cards for each additional hand;
- placing a wager by the player on at least one wager location of a plurality of wager locations for each hand, wherein each wager location represents different ranges of numbers;
- dealing three dealer cards to the player for each hand;
- totaling the combined value of the first two player cards and the three dealer cards for each hand; and
- determining if the player has a winning wager by determining if the total combined value of the two player cards and the three dealer cards for each hand is in a range of numbers wagered by the player for each hand.

9. The video playing card wagering game of claim 8, further comprising placing a wager by the player on at least one wager location of a plurality of wager locations for each additional hand.

10. The video playing card wagering game of claim 8, further comprising paying a bonus payoff when the combination of first two player cards and the three dealer cards represents a designated poker hand.

11. The video playing card wagering game of claim 8, further comprising making a separate wager before the current round begins for a progressive bonus.

* * * * *